US010863183B2

(12) United States Patent
Tanner et al.

(10) Patent No.: US 10,863,183 B2
(45) Date of Patent: Dec. 8, 2020

(54) DYNAMIC CACHING OF A VIDEO STREAM

(71) Applicant: Intel Corporation, Santa Clara, CA (US)

(72) Inventors: Jason Tanner, Folsom, CA (US); Arthur Jeremy Runyan, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/455,540

(22) Filed: Jun. 27, 2019

(65) Prior Publication Data

US 2019/0320185 A1 Oct. 17, 2019

(51) Int. Cl.
| | |
|---|---|
| H04N 19/00 | (2014.01) |
| H04N 19/172 | (2014.01) |
| H04N 19/176 | (2014.01) |
| H04N 19/119 | (2014.01) |
| H04N 19/182 | (2014.01) |

(52) U.S. Cl.
CPC ......... *H04N 19/172* (2014.11); *H04N 19/119* (2014.11); *H04N 19/176* (2014.11); *H04N 19/182* (2014.11)

(58) Field of Classification Search
CPC .. H04N 19/172; H04N 19/176; H04N 19/423; H04N 19/182; H04N 19/85; H04N 19/119
See application file for complete search history.

(56) References Cited

U.S. PATENT DOCUMENTS

| | | | |
|---|---|---|---|
| 2012/0237180 A1 | 9/2012 | Yoshioka | |
| 2014/0187331 A1* | 7/2014 | Kim | A63F 13/12 463/42 |
| 2016/0182946 A1* | 6/2016 | Diefenbaugh | H04N 21/4122 345/2.3 |
| 2016/0275919 A1 | 9/2016 | Lawrence et al. | |
| 2017/0006220 A1* | 1/2017 | Adsumilli | H04N 5/247 |
| 2018/0124355 A1 | 5/2018 | Perraud | |
| 2019/0042177 A1* | 2/2019 | Tanner | G06F 3/1454 |
| 2020/0234501 A1* | 7/2020 | Rodriguez | G06T 1/20 |

OTHER PUBLICATIONS

Non Final Office Action in U.S. Appl. No. 15/867,520 dated Aug. 22, 2019, 15 pgs.
USPTO Notice of Allowance issued in U.S. Appl. No. dated Dec. 3, 2019; 7 pages.

(Continued)

*Primary Examiner* — Zhihan Zhou
(74) *Attorney, Agent, or Firm* — Patent Capital Group

(57) ABSTRACT

Particular embodiments described herein provide for an electronic device that can be configured to identify a frame in a video stream, process a pixel row in the frame using a display engine to create blended and/or composited pixels, determine a coding unit (CU) row in the frame an encoder is encoding, determine if a distance between the pixel row in the frame and the CU row in the frame satisfies a threshold, and store the blended and/or composited pixels from the display engine in a cache if the threshold is satisfied or store the blended and/or composited pixels in memory if the threshold is not satisfied.

25 Claims, 7 Drawing Sheets

(56) References Cited

OTHER PUBLICATIONS

IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, IEEE Std 802.11ad™-2012, (Amendment to IEEE Std 802.11™-2012, as amended by IEEE Std 802.11ae™-2012 and IEEE Std 802.11aa™-2012), Dec. 28, 2012, 628 pages.

\* cited by examiner

DYNAMIC CACHING OF A VIDEO STREAM

TECHNICAL FIELD

This disclosure relates in general to the field of computing, and more particularly, to dynamic caching of a video stream.

BACKGROUND

Emerging network trends in systems place increasing performance demands on a system. The increasing demands can cause an increase of the use of resources in the system. The resources have a finite capability and each of the resources need to be managed. One factor of effectively managing resources is the ability to quickly process packets.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION

Example Embodiments

The following detailed description sets forth examples of apparatuses, methods, and systems relating to a system, method, apparatus, etc. for dynamic caching of a video stream, in accordance with an embodiment of the present disclosure. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Figure 1:
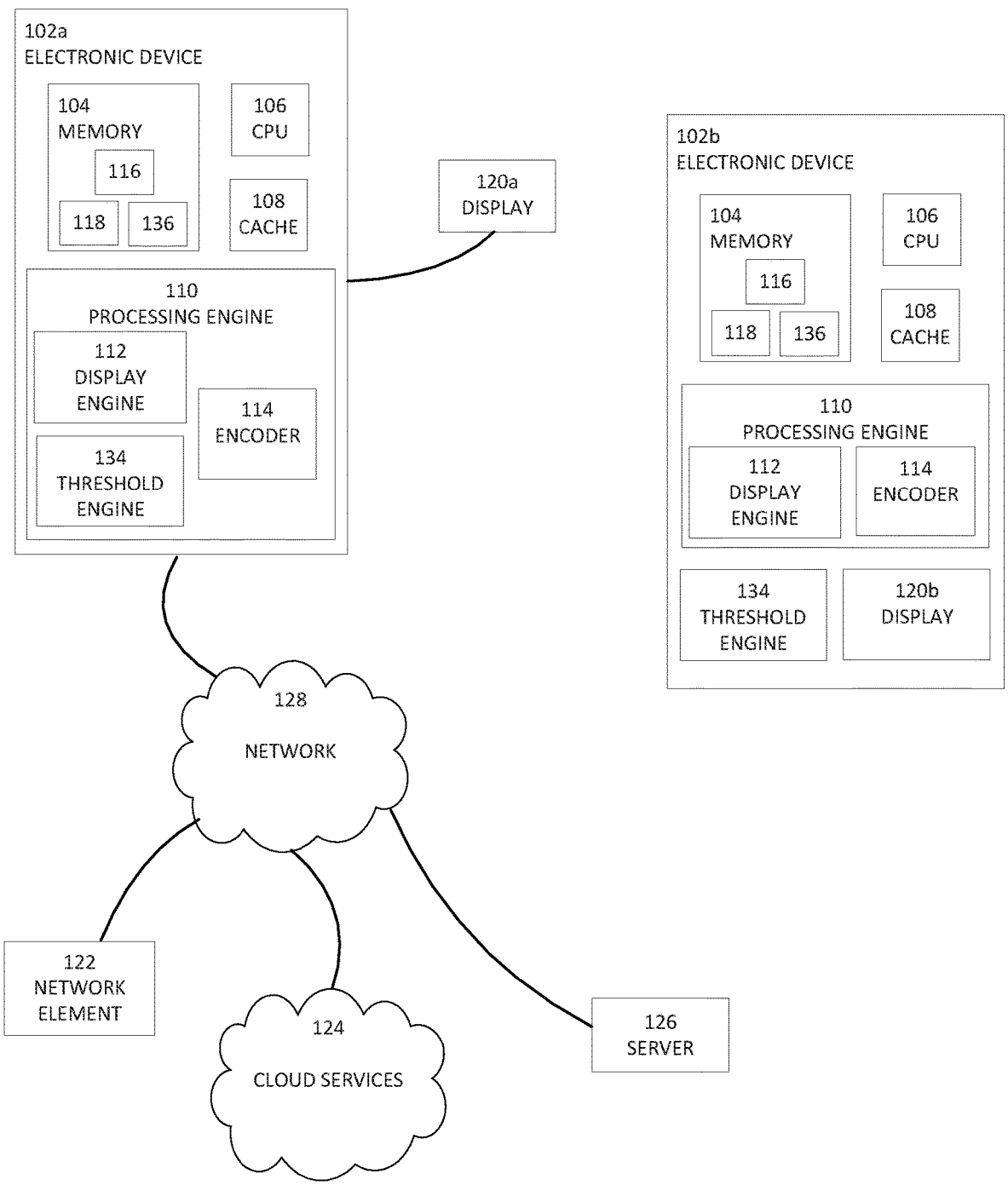
FIG. 1 is a block diagram of a system to enable dynamic caching of a video stream, in accordance with an embodiment of the present disclosure.

FIG. 1 is a simplified block diagram of a system configured to enable dynamic caching of a video stream, in accordance with an embodiment of the present disclosure. In an example, electronic device 102a can include memory 104, a processor or computer processing unit (CPU) 106, a cache 108, and a processing engine 110. Processing engine 110 can include a display engine 112, an encoder 114, and a threshold engine 134. Memory 104 can include a display engine register 116, an encoder register 118, and a threshold register 136. Electronic device 102a can be coupled to a display 120a. For example, electronic device 102a may be in wireless communication with display 120a. In another example, electronic device 102a may be directly connected to display 120a using a wired connection (e.g., a cable connection). In an example, an electronic device 102b can include memory 104, CPU 106, display engine 112, encoder 114, cache 108, a display 120b, and threshold engine 134.

Electronic device 102a can be in communication with a network element 122, cloud services 124, and/or a server 126 using a network 128. Electronic device 102b may be a standalone device and not connected to network 128. In some examples, electronic device 102a may be a standalone device and not connected to network 128. In addition, electronic device 102b may be in communication with network element 122, cloud services 124, and/or a server 126 using a network 128.

Display engine 112 can be configured to identify a video frame in a video stream and composite the video frame by blending and/or compositing pixels in the video frame. This can include one or more of blending multiple surfaces together, scaling a surface if needed, blending pixels, compositing pixels, apply post processing techniques, performing color space conversion, blending multiple layers (e.g., one is in an RBG color space and the other one is in a CMY, YUV, YIQ, etc. color space), etc. The blended and/or composited pixels are then written to an area of memory 104 (e.g., dynamic random access memory (DRAM)) if a threshold is not satisfied or if the threshold is satisfied, the blended and/or composited pixels are written to cache 108. Encoder 114 can be configured read the blended and/or composited pixels from memory 104 or cache 108 and to prepare the video frame for output. This can include one or more of encoding the video frame to meet specific formats and specifications, spatial compression, temporal compression, convert to frequency domain, quantization, motion estimation, etc.

Threshold engine 134 can be configured to determine the threshold while a video stream is being processed and store a value that represents the threshold in threshold register 136. More specifically, the threshold can be determined and/or changed for every frame in the video stream, at regular predetermined time intervals, after a predetermined amount of pixel rows have been processed by display engine 112, changes in the static nature of a scene are detected, changes in the temporal/spatial complexity are detected, changes in frequency of display engine 112 or encoder 114, changes in programs actively running, based on the cache hit rate of prior frames, changes in bandwidth used in memory, etc. The threshold can vary based on resolution, content motion complexity, amount of memory available, etc. The threshold value in threshold register 136 helps to ensure that the display engine does not write blended and/or composited pixels to the cache if the write to the cache may cause data from the encoder in the cache to be expelled. More specifically, if a determined distance between the pixel row being processed by display engine 112 and a coding unit (CU) row being processed by encoder 114 satisfies the threshold, then the output from display engine 112 can be sent to cache 108. If the determined distance between the pixel row being processed by display engine 112 and the CU row being processed by encoder 114 does not satisfy the threshold, then the output from display engine 112 can be sent to memory 104. The distance is the number of rows or lines in the frame that separate the pixel row being processed by display engine 112 and the CU row being processed by encoder 114.

Display engine 112 processes the video frame pixel row by pixel row (line by line) working left to right and top to bottom. Encoder 114 processes the video frame block by block and each block includes CU rows. The portion of the video frame display engine 112 processes is called the pixel row while the portion of the video frame encoder processes is a CU row. Display engine 112 and encoder 114 can work on a frame at the same time in parallel but on a row basis, display engine 112 and encoder 114 must work in series as encoder 114 must wait on display engine 112 to blend and/or composite the pixels in a specific row before encoder 114 can encode a block that includes the pixels from the specific row for output.

The term "coding unit" and "CU" are specific to high efficiency video coding (HEVC) and other encoders and decoders (codecs). As used herein, the term "coding unit" and "CU" encompass other similar terms used by other codecs (e.g. AVC uses the term macroblock row, etc.). Encoder 114 operates on a block basis or a block of multiple pixel rows. More specifically, as opposed to display engine 112 operating on a single pixel row, encoder 114 operates on groups of pixel rows (e.g., 16, 32, 64, 128, pixel rows) as a block. Display engine 112 can process pixel row_1, pixel row_2, etc., but encoder cannot begin processing the rows (CU rows) until a block of pixel rows has been processed by display engine 112. In an illustrative example, if encoder 114 is using the HEVC codec and 32×32 blocks, then encoder 114 will not begin processing rows until display engine 112 has processed thirty-two (32) pixel rows and encoder 114 must wait for the next thirty-two (32) pixel rows to be processed by display engine 112 until it can process the next block of rows.

Due to the content in the video stream being processed, the temporal/spatial complexity of the content in the video stream, the quantization used, etc. encoder 114 does not process rows at a fixed rate. Encoder 114 operates on a block (e.g., HEVC uses a 32×32 or a 64×64 block size) and some rows of a block may be static with no need for any processing. This allows multiple rows to be processed in a negligible amount of time. Other rows of a block may derive a lot of coefficients which take longer to be entropy coded and therefore take a relatively large amount of time to process. The rate that encoder 114 can process a frame may change up or down depending on the needed encoding and other tasks. Therefore, when processing a video frame, encoder 114 may run slower or faster relative to display engine 112.

Also, for block size conformance, some tiles may need two passes in the back end of encoder 114. For example, if a tile will take more bits to process than anticipated or the tile may take too many bits for efficient transmission (e.g., when opening a new program, the content on a display will typically change substantially from one frame to the next) a quantizer (e.g., lossy compression, color quantization, etc.) may change the quantization parameter from twenty (20) to thirty (30) so the tile will use less bits to transmit but the tile will be of lower quality and due to the lower quality, the tiles may need to be reencoded. This reencoding can cause encoder 114 to be out of sync with display engine 112 by a significant amount (e.g., the size of the tile at a minimum). A tile is a group of blocks or CUs, that is less than a frame size. A tile is the smallest size or area of frame data that is transmitted. A block or CU by itself cannot be transmitted because the blocks or CUs need neighbor block or CU information for proper context to decode.

A tile is used in the standards body and is an independently decodable unit. Once a tile is done being encoded it is ready for transmission. A CU by itself cannot be transmitted because it needs neighbor CU information for proper context to decode. Waiting for the entire frame to complete before transmission results in higher latency and the smallest unit that can be transmitted to reduce latency is a tile. A CU/block is a processing unit in image and video compression formats based on linear block transforms, (e.g., discrete cosine transform (DCT)). A block (or macroblock or CU) typically consists of samples (HEVC uses 64×64 or 32×32 blocks, AVC uses 16×16 blocks, etc.), and can be further subdivided into transform blocks, and may be further subdivided into prediction blocks. Any changes for a scene or image that will be displayed on a display can produce frames that are two to five times larger than a bit rate target and that can cause significant tile rewrites or the entire frame may be dropped. In addition, any tile needing two passes can cause the encoder to fall way behind display engine 112 and become out of sync. When display engine 112 and encoder 114 are out of sync (e.g., encoder 114 is taking longer to encode data than display engine 112 is taking to write the data to memory), any traffic that is sent to cache 108 by display engine 112 may expel encoder data needed by encoder 114.

To help prevent display engine 112 and encoder 114 from being out of sync, a display pointer and an encoder pointer may be used. In a specific example, a head pointer and a tail pointer may be used. With the display pointer and the encoder pointer, display engine 112 and encoder 114 can be configured to determine a distance in CU rows between the pixel row being processed by display engine 112 and the CU row of the block being processed by encoder 114. The term "CU row" and its derivatives include the row of the CU or block being encoded by encoder 114. The determined distance in CU rows can be compared to a threshold. If the determined distance between the pixel row being processed (or most recently processed) by display engine 112 and the CU row being processed (or most recently processed) by encoder 114 satisfies the threshold, then the output from display engine 112 can be sent to cache 108. If the determined distance between the pixel row being processed (or most recently processed) by display engine 112 and the CU row being processed (or most recently processed) by encoder 114 does not satisfy the threshold amount, then the output from display engine 112 can be sent to memory 104. For example, if encoder 114 is taking a relatively long amount of time to process one or more CUs row due to complexity of the data, display engine 112 may process a plurality of pixel rows and the distance between a pixel row being processed by display engine 112 and a CU row being processed by encoder 114 may be greater than the threshold.

The threshold (the amount of CU rows that can separate the pixel row being processed by display engine 112 and the CU row being processed by encoder 114) can be updated every frame or during processing of a frame. If the threshold is satisfied, display engine will write the blended and/or composited pixels to cache 108. If the threshold is not satisfied, display engine 112 will write the blended and/or composited pixels to memory 104 (e.g., DRAM). The threshold can vary based on resolution, content motion complexity, amount of memory available, etc. For example, if a large resolution frame is being processed and encoder 114 will need a relatively large amount of cache space in cache 108, then the threshold can be decreased so display engine 112 does not write data to cache 108 and overwrite any data from encoder 114. If during processing of the large frame, encoder 114 begins another encoding or decoding task (e.g., decoding a video conference or movie playback), then the threshold may be further decreased. After the other encoding or decoding task is completed, the threshold may be increased to allow display engine 112 to write data to cache 108. Data (e.g., blended and/or composited pixels) in cache 108 can be accessed by encoder 114 quicker than data in memory 104 and therefore latency in the system may be reduced.

The display pointer and the encoder pointer allow display engine 112 to composite a frame and encoder 114 to run in parallel on the same frame. Cache 108 may be single frame buffer that is shared between display engine 112 and encoder 114. Because cache 108 may be a shared cache, display engine 112 must be configured to ensure it does not start to process a new frame and pass encoder 114 if encoder 114 is still processing pixels from a past frame.

It is to be understood that other embodiments may be utilized and structural changes may be made without departing from the scope of the present disclosure. Substantial flexibility is provided by the system and electronic devices 102a and/or 102b in that any suitable arrangements and configuration may be provided without departing from the teachings of the present disclosure. Elements of FIG. 1 may be coupled to one another through one or more interfaces employing any suitable connections (wired or wireless), which provide viable pathways for network (e.g., network 128, etc.) communications. Additionally, any one or more of these elements of FIG. 1 may be combined or removed from the architecture based on particular configuration needs. The system and electronic devices 102a and 102b may include a configuration capable of transmission control protocol/Internet protocol (TCP/IP) communications for the transmission or reception of packets in a network. The system and electronic devices 102a and/or 102b may also operate in conjunction with a user datagram protocol/IP (UDP/IP) or any other suitable protocol where appropriate and based on particular needs.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur. Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment.

For purposes of illustrating certain example techniques of the system and electronic devices 102a and 102b, the following foundational information may be viewed as a basis from which the present disclosure may be properly explained. End users have more media and communications choices than ever before. A number of prominent technological trends are currently afoot (e.g., more computing devices, more online video services, more Internet traffic), and these trends are changing the media delivery landscape. Devices and systems are expected to increase performance and function. However, the increase in performance and/or function can cause bottlenecks within the resources of the system and electronic devices in the system. One cause of the bottlenecks is the ability to quickly process packets in a data stream, particularly a video data stream.

More specifically, display latency is critical in some systems, especially those systems that include wireless docking and wireless virtual reality (VR). Part of the display latency is created when a display engine blends or composites pixels, writes those pixels to memory, and then an encoder reads those pixels from memory. Complicating matters is that the display engine writes at a constant rate but the encoder does not encode the video stream at a constant rate. In addition, the encoder often runs on a different frequency (especially with potential multiple passes to encode a tile).

In some systems, video stream traffic flows through memory and the display engine writes an entire frame to memory before the encode starts to encode the frame. In other systems, the interface between the display engine and the encoder is changed to enable all the writes to be done to a cache. However, even with a shared cache or buffer between the display engine and the encoder, writing to a cache can be disruptive to encode because the majority of bandwidth comes from the encoder. More specifically, one disadvantage to always writing to a cache is due to the fact that the major bandwidth impact to encode a video stream is the read writes for integer motion estimation during the encoding process where eighty percent of the traffic is typically motion estimation compared to twenty percent (20%) for source reads (display engine writes become the source or encoder reads). If the display engine writes always go to the cache, then often the motion estimation traffic is evicted. In a specific example, when the display engine and encoder are out of sync, one hundred percent of the display engine writes can evict needed encoder traffic in the cache which increases the likelihood of thrashing the cache and instead of improving latency, can actually lead to higher latency.

In other systems, a streaming buffer is created to stream memory traffic between the display engine and the encoder by allocating a portion of the display engine writes to the streaming buffer. The streaming buffer allocates a portion of a last level cache for the display engine writes. Similar to the display engine always writing to a cache, this permanent allocation reduces the amount of caching available to the encoder, especially for motion estimation. Again, this can slow the encoder due to motion estimation needing to wait more often for the motion estimation traffic to be fetched from memory or higher in the cache. In addition, for multiple tile passes or if the encoder falls behind the display engine for more CU rows or lines than the capacity of the streaming buffer, the display engine will stall. The stalls will result in an increase in latency as well or result in dropped frames since the display engine has a fixed time to blend or composite pixels. More specifically, for 4 k usages, there is about five hundred (500) micro seconds (us) of latency that can be tolerated without resulting in a frame drop. What is needed is a system and method to write to a shared cache without slowing down the encoder or the display engine.

A device (e.g., electronic device 102a and/or 102b) to help facilitate dynamic caching of a video stream, as outlined in FIG. 1, can resolve these issues (and others). In an example, the device can be configured to include a display engine (e.g., display engine 112) and an encoder (e.g., encoder 114). The device can be configured to improve latency by sending source pixels of a blended and/or composited portion of a frame to the encoder relatedly quickly with a low probability of impacting the cached pixels the encoder is using for encoding.

More specifically, as the display engine blends or composites pixels from a row in a frame, the display engine sends the blended and/or composited pixels to a cache (e.g., cache 108) or memory (e.g., memory 104) and a register value to a display engine register (e.g., display engine register 116) that indicates the row of the blended and/or composited pixels the display engine has written out. The value in display engine register 116 may indicate the pixel row that the display engine has most recently blended and/or composited and the value can be used to determine the pixel row that the display engine is blending and/or compositing. The encoder can read the value in the display engine register and a block from the memory that is up to X number of rows that have been written out by the display engine. The number of rows is dependent on the size of the blocks being used by the encoder (e.g., HEVC uses 64×64 or 32×32 blocks, AVC uses 16×16 blocks, etc.) For example, if the block size is 64×64 the encoder waits for the display engine to write increments of 64 rows of pixels before starting to encode a CU row of the block. If the block size is 32×32, the encoder waits for the display engine to write increments of 32 rows of pixels before starting to encode a CU row of the block. This allows the encoder to be working on the same frame that the display engine is writing out to reduce latency.

As the encoder begins to process a block from the frame, the encoder will write a value to an encoder register (e.g., encoder register 118) that indicates a CU row of a block that the encoder is encoding. The value in encoder register 118 may indicate the CU of a row that the encoder has most recently encoded and the value can be used to determine the CU row of a block that the encoder is encoding. The display engine can read the value in the encoder register and use the value to determine if the display engine should write the blended and/or composited pixels to the cache or to memory. In an illustrative example, if the encoder is using a relatively large amount of the cache, then the display engine should not write blended and/or composited pixels to the cache as that may cause data from the encoder in the cache to be expelled. However, if the encoder is using a relatively small amount of the cache, meaning the cache has available space, then the display engine can write the blended and/or composited pixels to the cache where the blended and/or composited pixels can be accessed relatively quickly by the encoder.

In an example, the display engine and encoder can be configured to determine a distance in CU rows between the pixel row being processed (or most recently processed) by the display engine and the CU row of the block being processed (or most recently processed) by the encoder. The determined distance in CU rows can be compared to a threshold. If the determined distance between the pixel row being processed (or most recently processed) by the display engine and the CU row being processed (or most recently processed) by the encoder satisfies the threshold, then the output from the display engine can be sent to the cache. If the determined distance between the pixel row being processed (or most recently processed) by the display engine and the CU row being processed (or most recently processed) by the encoder does not satisfy the threshold, then the output from the display engine can be sent to memory. The threshold can be updated every frame or during the processing of a frame and can vary based on resolution, content motion complexity, amount of memory available, etc. This helps prevent the display engine or the encoder for stalling and data will only take up space in the cache when the display engine and encoder are working on collocated areas and there is not a high probability that data may be evited from the cache.

In a specific example, a head pointer and a tail pointer may be used. With the head pointer and the tail pointer, the display engine and encoder can be configured to determine a distance in CU rows between the pixel row being processed by the display engine and the CU row of the block being processed by the encoder. The head pointer is written by the display engine. As the display engine writes a line, it updates which location the display engine has written out. The encoder can read in a block once up to X number of pixel rows that have been written out by the display engine. This is so the encoder can be working on the same frame that the display engine is writing out to reduce latency. If the encoder waited for the display engine to process a frame, for example eight (8) milliseconds (ms), and then encode the frame, that may be eight (8) ms of latency. To improve latency, as the display engine writes out enough pixels for a block of CUs, the encoder can read a row of CUs and process the row of CUs block by block. The display and the encoder can be more closely coordinated than a tile but the encoder can only write out a tile, as opposed to a block of CU, which is what determines the latency. In a specific illustrative example, during the eight (8) ms the display engine is processing a frame, the encoder can encode twenty-two (22) tile rows of CUs (the number of CUs is specific to the specification being used by the encoder). Therefore, instead of eight (8) ms of latency, the latency can be eight (8) ms/twenty-two (22) (twenty-two (22) tile rows of CUs) which is much lower than one (1) ms. The encoder also writes a head pointer back to the display engine. Once the encoder has processed a full CU row, it will update the row number to the display engine. That way the display engine can determine the difference between rows the display engine is processing and the encoder is processing and determine if composited and/or blended pixels should be written to the cache or to memory.

The difference between rows the display engine is processing and the encoder is processing, or how far apart the encoder is from the display engine, determines whether or not the threshold is satisfied and if the display engine writes will be sent to the cache. The threshold can be set according to how large the cache is, how much the cache is being shared with different workloads, how large the frame size is to be encoded, how much of the frame is static, etc. The cache is not allocated like the streaming buffer so a low threshold will only send the blended and/or composited pixels from the display engine to the cache if the difference between rows the display engine is processing and the encoder is processing is a relatively small amount. However, if the cache is large and the cache can accommodate a relatively large amount of traffic, then the threshold can be larger.

The display engine and encoder can be configured to not process parts of the frame that have not changed. This makes the display engine and encoder performance even more variable. For example, if the display engine needed to write the top and bottom parts of a frame (e.g., moving the mouse at the top of an image with a time change or blinking taskbar item), the display engine may jump from the top of the frame to the bottom of the frame.

In a first example option, the encoder may improve the quality of the frame and processes the entire frame again. In a second example option, the encoder does not need to process the entire frame again and can skip static sections. The display engine can be unaware of the status of the encoder and whether the first example option was executed or the second example option was executed. Setting dynamic caching allows the display engine to only cache the top portion of the frame if the first example option is executed, but if the second example option is executed, since the encoder will be following the display closely, both portions of the frame can be cached.

For each frame, the threshold can be set to a different value. In some examples, a sudden spike of a relatively large amount of changes in a frame can be followed by a sudden change in a relatively large amount of static frames or partially static frames. Like scrolling a webpage, the initial scroll changes pretty much the whole frame but after the scrolling, as the webpage is viewed, the whole frame is static. Static indicators will show that the encoder will not use as much bandwidth for motion estimation since motion estimation will be disabled for all static blocks. Thus, the threshold can be increased and not impact the encoder workload or risk writes from the display engine expelling data in the cache.

As a frame in a video stream is processed, the display engine can use the threshold to determine whether to write to the cache or not. For example, as a frame in a video stream is processed, the display engine and encoder can start out closely synchronized so the threshold can be large and the writes from the display engine can go to the cache. But if the encoder needs to rewrite a tile, then the encoder may get out of sync and stay out of sync for the rest of the frame. If this happens, the threshold can be reduced and the display engine can write to memory for the rest of the frame so as to not interfere with the data in the cache from the encoder as the encoder is working further down the frame. Another scenario is where the content starts complicated and then simplifies. At the start, both the display engine and the encoder are close together, but gradually, as the complicated content is encoded, the encoder drifts behind the display engine (the difference between rows the display engine is processing and the encoder is processing increases), the threshold is not satisfied, and cache writes by the display engine stop. As the content simplifies or a static section is hit, the encoder runs faster and can catch up to the display engine (the difference between rows the display engine is processing and the encoder is processing decreases), the threshold is satisfied, and the display engine can begin cache writes again. Other examples of when the encoder drifts behind the display engine and cache writes stop include media changing its clock higher/lower, the encoder starting late due to other work, other workloads start which also use the cache, etc.

Turning to the infrastructure of FIG. 1, generally, the system may be implemented in any type or topology of networks. Network 128 represents a series of points or nodes of interconnected communication paths for receiving and transmitting packets of information that propagate through the system. Network 128 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In the system, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Messages through the network could be made in accordance with various network protocols, (e.g., Ethernet, Infiniband, OmniPath, etc.). Additionally, radio signal communications over a cellular network may also be provided in the system. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, network element 122 and server 126 are meant to encompass, network appliances, servers, routers, switches, gateways, bridges, load balancers, processors, modules, or any other suitable device, component, element, or object operable to exchange information in a network environment. Electronic devices 102a and 102b may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Each of electronic devices 102a and 102b may be virtual or include virtual elements.

In regard to the internal structure associated with the system, each of electronic devices 102a and 102b can include memory elements (e.g., memory 104 or cache 108) for storing information to be used in the operations outlined herein. Each of electronic devices 102a and 102b may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in the system could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media or machine-readable media. In some of these instances, memory elements can store data used for the operations described herein. This includes the memory elements being able to store software, logic, code, or processor instructions that are executed to carry out the activities described herein.

In an example implementation, elements of the system, such as electronic devices 102a and 102b may include software modules (e.g., display engine 112, encoder 114, threshold engine 134, etc.) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of electronic devices 102a and 102b may include one or more processors (e.g., CPU 106) that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an ASIC that includes digital logic, software, code, electronic instructions, or any suitable combination thereof. Any of the potential processing elements, modules, and machines described herein should be construed as being encompassed within the broad term 'processor.'

Figure 2:
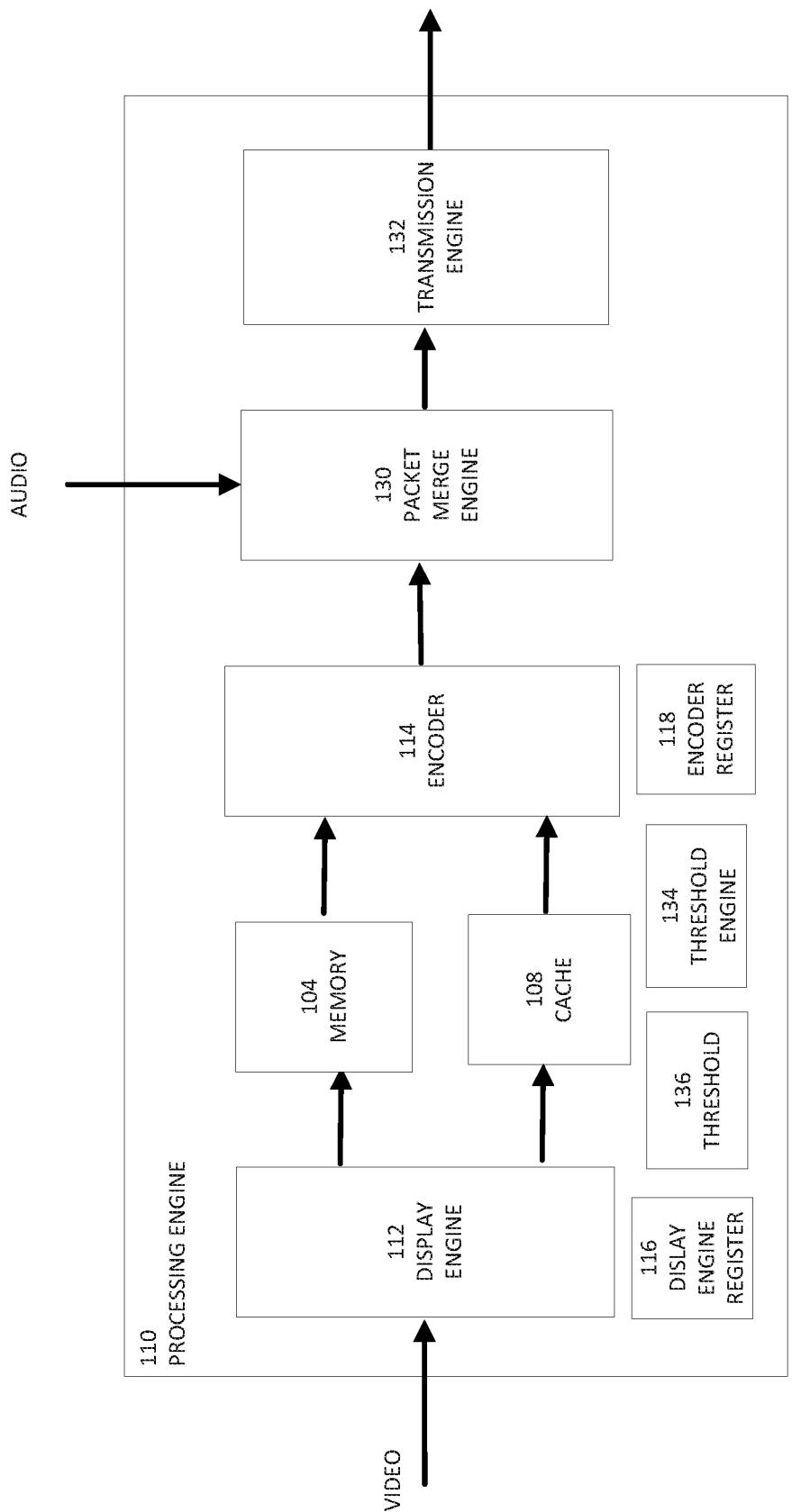
FIG. 2 is a block diagram of a portion of a system to enable dynamic caching of a video stream, in accordance with an embodiment of the present disclosure.

Turning to FIG. 2, FIG. 2 is a simplified block diagram of an example of processing engine 110. As illustrated in FIG. 2, processing engine 110 can include memory 104, cache 108, display engine 112, encoder 114, display engine register 116, encoder register 118, a transmission engine 132, threshold engine 134, and a threshold register 136. In one embodiment, processing engine 110 can include a packet merge engine 130.

In an illustrative example, a video stream is received by processing engine 110. Display engine 112 can identify a video frame in the video stream and composite the video frame by blending and/or compositing pixels in a pixel row. Display engine 112 can read the value in encoder register 118 to determine a distance in CU rows between the pixel row being processed (or most recently processed) by display engine 112 and the CU row of the block being processed (or most recently processed) by encoder 114 and compare the distance in CU rows to a threshold value stored in threshold register 136.

Threshold engine 134 can be configured to determine if the threshold value stored in threshold register 136 should be updated or changed. The threshold value can be updated or changed every frame in the video stream, at regular predetermined time intervals, after a predetermined amount of pixel rows have been processed by display engine 112, changes in the static nature of a scene are detected, changes in the temporal/spatial complexity are detected, changes in frequency of display engine 112 or encoder 114, changes in programs actively running, based on the cache hit rate of prior frames, changes in bandwidth used in memory, etc. and can vary based on resolution, content motion complexity, amount of memory available, etc. The threshold value helps to ensure that display engine 112 does not write blended and/or composited pixels to cache 108 if the write to cache 108 may cause data from encoder 114 in cache 108 to be expelled.

If the threshold value is satisfied, display engine 112 can write the blended and/or composited pixels to cache 108. If the threshold value is not satisfied, display engine 112 can write the blended and/or composited pixels to memory 104. In an example, the area of memory 104 when blended and/or composited pixels are written may be a specially allocated region of memory 104 allocated for writes from display engine 112 and may be configured as a buffer. Display engine 112 can also write a value that represents the pixel row to display engine register 116.

Encoder 114 can snoop cache 108 first to see if there are any blended and/or composited pixels from display engine 112 in cache 108. If there are not any blended and/or composited pixels in cache 108, then encoder 114 can read the blended and/or composited pixels from memory 104. Encoder 114 can also read the value in display engine register 116 that represents the pixel row processed by display engine 112. The value in display engine register 116 is used by encoder 114 to determine a block up to X number of pixel rows that have been written out by the display engine. This is so the encoder can be working on the same frame that the display engine is writing out to reduce latency. Encoder 114 can be configured read the blended and/or composited pixels from memory 104 or cache 108 and to prepare the video frame or tile from the video frame for output. Encoder 114 writes a value that represents the CU row being processed by encoder 114 into encoder register 118, where it can be read by display engine 112.

In some examples, the video data from encoder 114 is communicated to packet merge engine 130 where the video data can be merged with an audio stream. Transmission engine 132 can prepare the video data or video and merged audio data for output to a display. For example, transmission engine 132 can prepare the encoded video data or video and merged audio data for wireless output to display 120a (illustrated in FIG. 1).

Figure 3:
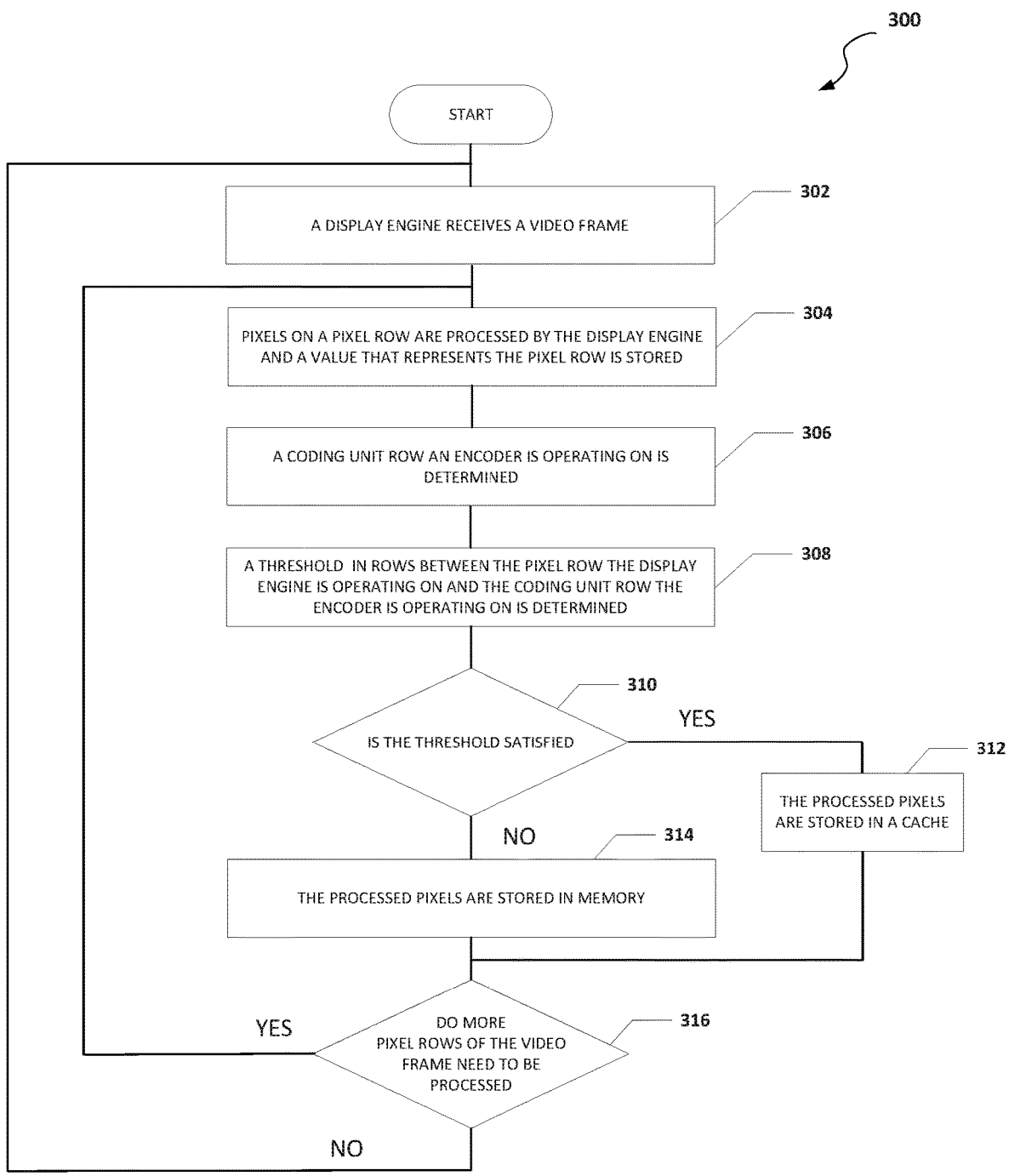
FIG. 3 is a flowchart illustrating potential operations that may be associated with the system in accordance with an embodiment.

Turning to FIG. 3, FIG. 3 is an example flowchart illustrating possible operations of a flow 300 that may be associated with dynamic caching of a video stream, in accordance with an embodiment. In an embodiment, one or more operations of flow 300 may be performed by processing engine 110, display engine 112, encoder 114, packet merge engine 130, transmission engine 132, and/or threshold engine 134. At 302, a display engine receives a video frame. At 304, pixels on a pixel row are processed by the display engine and a value that represents the pixel row is stored. For example, the value that represents the pixel row being processed (or most recently processed) by display engine 112 can be stored in display engine register 116. At 306, a CU row an encoder is operating on is determined. For example, display engine 112 can read a value from encoder register 118 that represents a CU row encoder 114 is encoding. At 308, a threshold in rows between the pixel row the display engine is operating on and the CU row the encoder is operating on is determined. At 310, the system determines if the threshold is satisfied. If the threshold is satisfied, then the pixels processed by the display engine are written to a cache, as in 312. If the threshold is not satisfied, then the pixels processed by the display engine are written to memory, as in 314. At 316, the system determines if more pixel rows of the video frame need to be processed. If more pixel rows of the video frame need to be processed, then pixels on a (new) pixel row are processed by the display engine and a value that represents the pixel row is stored, as in 304. If no further pixel rows of the video frame need to be processed, then the display engine receives a (new) video frame, as in 302.

Figure 4:
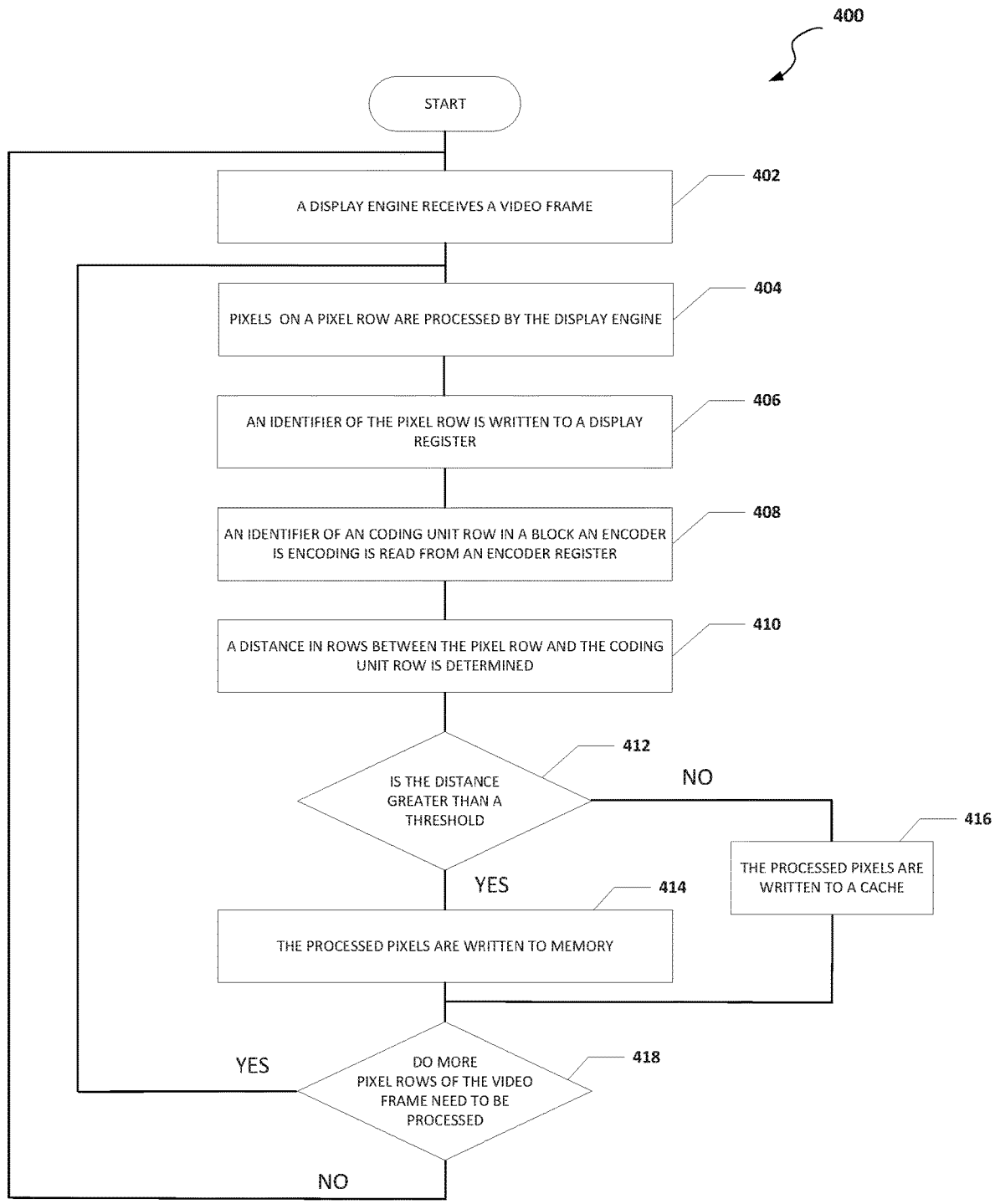
FIG. 4 is a flowchart illustrating potential operations that may be associated with the system in accordance with an embodiment.

Turning to FIG. 4, FIG. 4 is an example flowchart illustrating possible operations of a flow 400 that may be associated with dynamic caching of a video stream, in accordance with an embodiment. In an embodiment, one or more operations of flow 400 may be performed by processing engine 110, display engine 112, encoder 114, packet merge engine 130, transmission engine 132, and/or threshold engine 134. At 402, a display engine receives a video frame. At 404, pixels on a pixel row are processed by the display engine. At 406, an identifier of the pixel row is written to a display register. For example, the value that represents the pixel row being processed (or most recently processed) by display engine 112 can be stored in display engine register 116. At 408, an identifier of a CU row in a block an encoder is encoding is read from an encoder register. For example, display engine 112 can read a value from encoder register 118 that represents a CU row in a block encoder 114 is encoding. At 410, a distance in rows between the pixel row and the CU row is determined. At 412, the system determines if the distance is greater than a threshold. If the distance is greater than the threshold, then the processed pixels are written to memory, as in 414. If the distance is not greater than the threshold, then the processed pixels are written to a cache, as in 416. At 418, the system determines if more pixel rows of the video frame need to be processed. If more pixel rows of the video frame need to be processed, then pixels on a (new) pixel row are processed by the display engine, as in 404. If no further pixel rows of the video frame need to be processed, then the display engine receives a (new) video frame, as in 402. Note that the examples herein of where the processed pixels are written or stored if the threshold is satisfied, if the distance in CU rows is greater than the threshold, etc. are for illustration purposes only and may be changed without departing from the scope of the present disclosure (e.g., in FIG. 3, if the threshold is satisfied then the pixels processed by the display engine are written to a cache while in FIG. 4, if the threshold is satisfied, then the processed pixels are written to memory).

Figure 5:
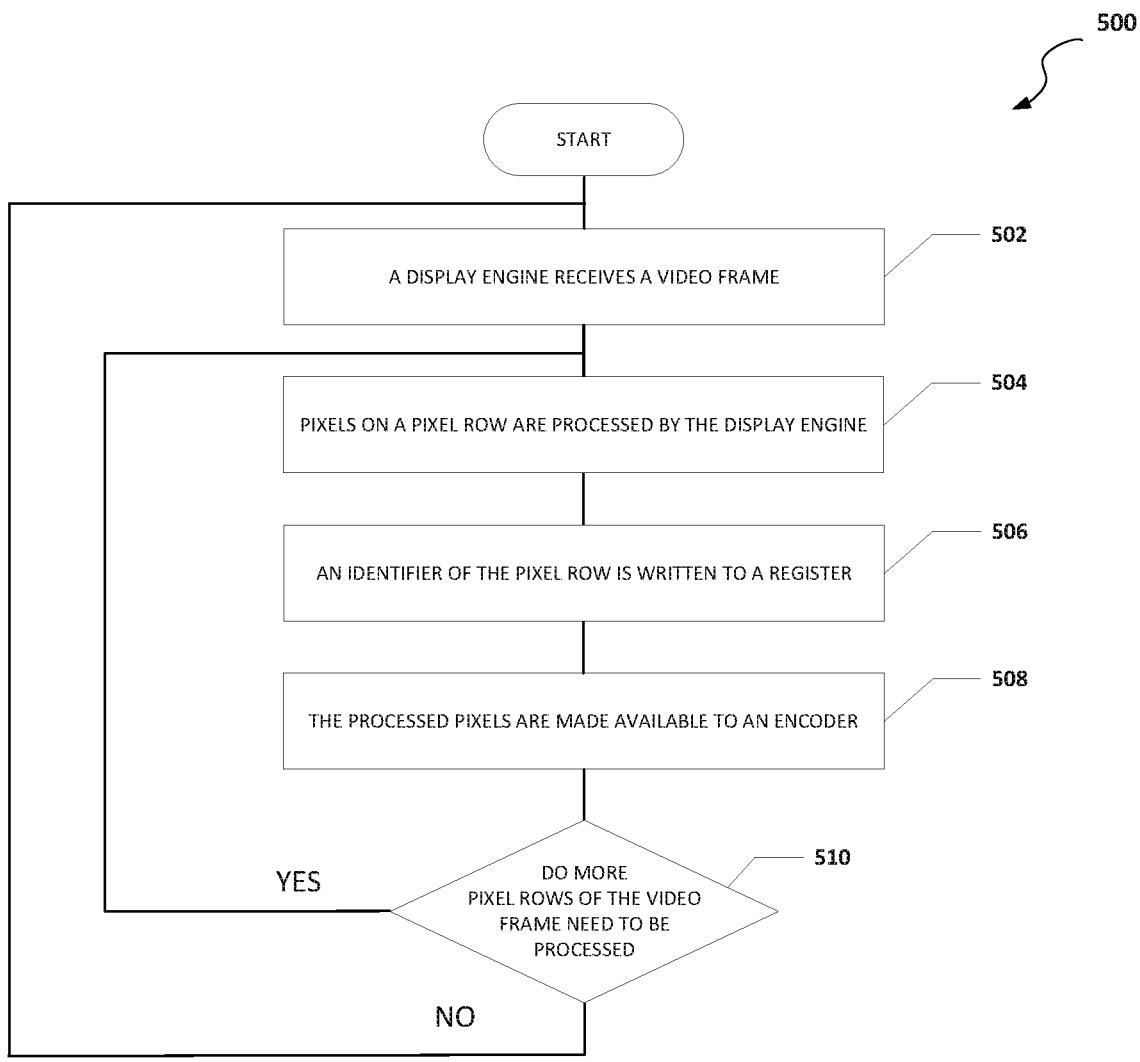
FIG. 5 is a flowchart illustrating potential operations that may be associated with the system in accordance with an embodiment.

Turning to FIG. 5, FIG. 5 is an example flowchart illustrating possible operations of a flow 500 that may be associated with dynamic caching of a video stream, in accordance with an embodiment. In an embodiment, one or more operations of flow 500 may be performed by processing engine 110, display engine 112, encoder 114, packet merge engine 130, transmission engine 132, and/or threshold engine 134. At 502, a display engine receives a video frame. At 504, pixels on a pixel row are processed by the display engine. At 506, an identifier of the pixel row is written to a register. For example, the value that represents the pixel row being processed (or most recently processed) by the display engine can be stored in display engine register 116. At 508, the processed pixels are made available to an encoder. For example, the processed pixels can be written to memory 104 or to cache 108. At 510, the system determines if more pixel rows of the video frame need to be processed. If more pixel rows of the video frame need to be processed, then pixels on a (new) pixel row are processed by the display engine, as in 504. If no further pixel rows of the video frame need to be processed, then the display engine receives a (new) video frame, as in 502.

Figure 6:
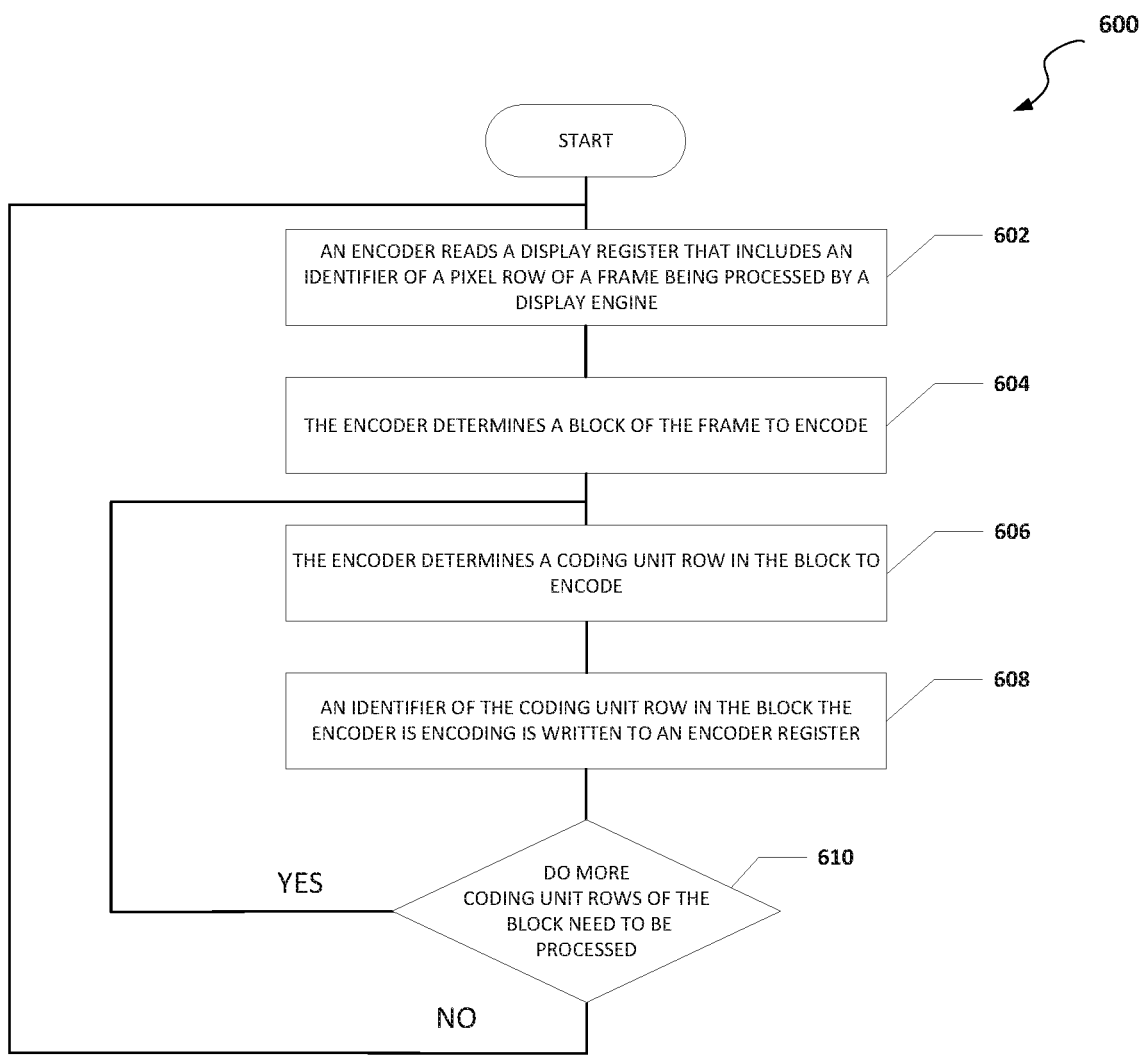
FIG. 6 is a flowchart illustrating potential operations that may be associated with the system in accordance with an embodiment.

Turning to FIG. 6, FIG. 6 is an example flowchart illustrating possible operations of a flow 600 that may be associated with dynamic caching of a video stream, in accordance with an embodiment. In an embodiment, one or more operations of flow 600 may be performed by processing engine 110, display engine 112, encoder 114, packet merge engine 130, transmission engine 132, and/or threshold engine 134. At 602, an encoder reads a display register that includes an identifier of a pixel row of a frame being processed by a display engine. At 604, the encoder determines a block of the frame to encode. For example, based on the value in display engine register 116, the encoder can determine a block up to X number of pixel rows that have been written out by display engine 112. The number of pixel rows is dependent on the size of blocks being used by the encoder (e.g., HEVC uses 64×64 or 32×32 blocks, AVC uses 16×16 blocks, etc.) For example, if the block size is 64×64 the encoder waits for the display engine to write increments of 64 rows of pixels before starting to encode a CU row of the block. If the block size is 32×32, the encoder waits for the display engine to write increments of 32 rows of pixels before starting to encode a CU row of the block. At 606, the encoder determines a CU row in the block to encode. At 608, an identifier of the CU row in the block the encoder is encoding is written to an encoder register. At 610, the system determines if more CU rows of the block need to be processed. If more CU rows of the block need to be processed, then the encoder determines a (new) CU row in the block to encode, as in 606. If no further CU rows of the block need to be processed, then encoder reads a display register that includes an identifier of a pixel row of a frame being processed by a display engine, as in 602, and at 604, the encoder determines a (new) block of the frame to encode.

Figure 7:
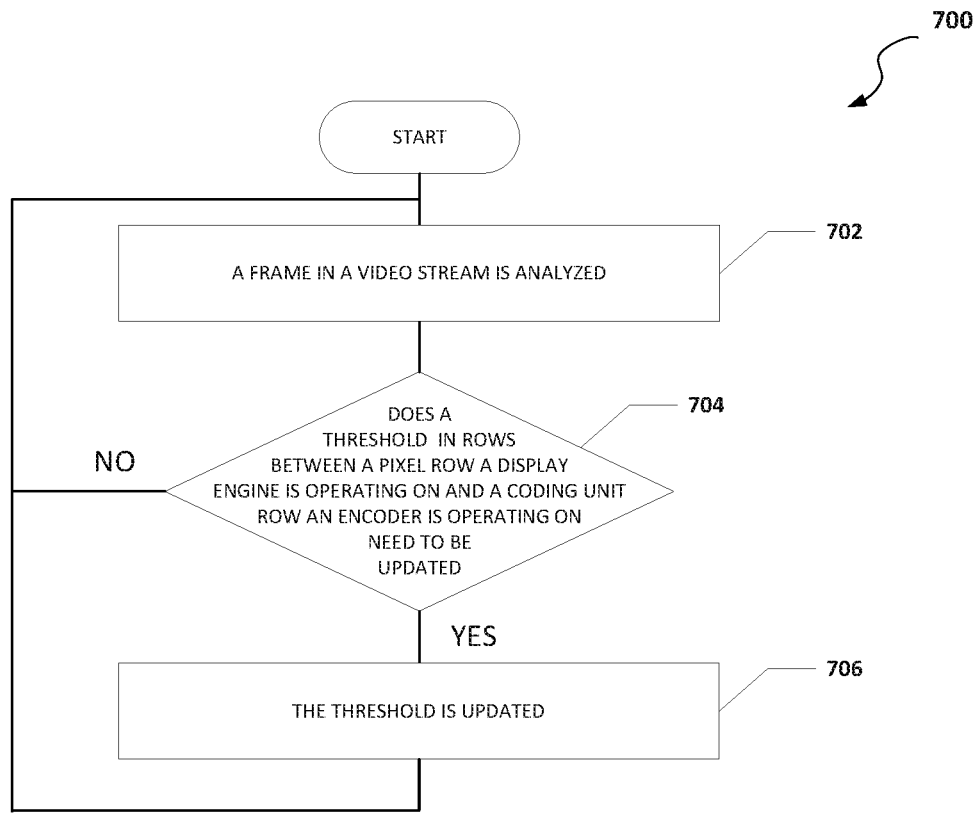
FIG. 7 is a flowchart illustrating potential operations that may be associated with the system in accordance with an embodiment.

Turning to FIG. 7, FIG. 7 is an example flowchart illustrating possible operations of a flow 700 that may be associated with dynamic caching of a video stream, in accordance with an embodiment. In an embodiment, one or more operations of flow 700 may be performed by processing engine 110, display engine 112, encoder 114, packet merge engine 130, transmission engine 132, and/or threshold engine 134. At 702, a frame in a video stream is analyzed. At 704, the system determines if a threshold in rows between a pixel row a display engine is operating on and a CU row an encoder is operating on needs to be updated. If the system determines the threshold in rows between a pixel row a display engine is operating on and a CU row an encoder is operating on needs to be updated, then the threshold is updated, as in 706. If the system determines the threshold in rows between a pixel row a display engine is operating on and a CU row an encoder is operating on does not need to be updated, then the system returns to 702 and a frame in a video stream is analyzed. The frame in the video stream that is analyzed may be a new frame or the same frame may be reanalyzed. In some examples, the threshold may need to be updated if a frame allows or includes static rows. The threshold value can be updated or changed every frame in the video stream, at regular predetermined time intervals, after a predetermined amount of pixel rows have been processed by display engine 112, changes in the static nature of a scene are detected, changes in the temporal/spatial complexity are detected, changes in frequency of display engine 112 or encoder 114, changes in programs actively running, based on the cache hit rate of prior frames, changes in bandwidth used in memory, etc. and can vary based on resolution, content motion complexity, amount of memory available, etc. Other examples of where the threshold may be updated include how large the cache is, how much the cache is being shared with different workloads, how large the frame size to be encoded is, how much of the frame is static, etc.

It is also important to note that the operations in the preceding flow diagrams (i.e., FIGS. 3-7) illustrate only some of the possible correlating scenarios and patterns that may be executed by, or within, the system. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the system in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although the system has been illustrated with reference to particular elements and operations that facilitate the communication process, these elements and operations may be replaced by any suitable architecture, protocols, and/or processes that achieve the intended functionality of the system.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example C1 is at least one machine readable medium having one or more instructions that when executed by at least one processor, cause the at least one processor to identify a frame in a video stream, process a pixel row in the frame using a display engine to create blended and/or composited pixels, determine a coding unit (CU) row in the frame an encoder is encoding, determine if a distance between the pixel row in the frame and the CU row in the frame satisfies a threshold, and store the blended and/or composited pixels from the display engine in a cache if the threshold is satisfied.

In Example C2, the subject matter of Example C1 can optionally include one or more instructions that, when executed by at least one processor, causes the at least one processor to store the blended and/or composited pixels in memory if the threshold is not satisfied.

In Example C3, the subject matter of any one of Examples C1-C2 can optionally include where the CU row in the frame the encoder is encoding is determined by reading a value stored in an encoder register.

In Example C4, the subject matter of any one of Examples C1-C3 can optionally include one or more instructions that, when executed by at least one processor, causes the at least one processor to identify a new frame in the video stream, and change the threshold to a new threshold.

In Example C5, the subject matter of any one of Examples C1-C4 can optionally include one or more instructions that, when executed by at least one processor, causes the at least one processor to store a pixel row value that represents the pixel row in the frame that was processed by the display engine in a display engine register.

In Example C6, the subject matter of any one of Examples C1-C5 can optionally include where the encoder uses the pixel row value to determine a block in the frame to encode.

In Example A1, an electronic device can include memory, a cache, a processing engine, where the processing engine includes a display engine and an encoder. The electronic device also includes at least one processor, where the processing engine is configured to cause the at least one processor to process, using the display engine, a pixel row in a frame that is included in a video stream, determine a coding unit (CU) row in the frame the encoder is encoding, determine if a distance between the pixel row in the frame and the CU row in the frame satisfies a threshold, and store blended and/or composited pixels from the display engine in a cache if the threshold is satisfied.

In Example A2, the subject matter of Example A1 can optionally include where the processing engine is configured to cause the at least one processor to store the blended and/or composited pixels in memory if the threshold is not satisfied.

In Example A3, the subject matter of any one of Examples A1-A2 can optionally include an encoder register, wherein a value that represents the CU row in the frame the encoder is encoding is stored in the encoder register.

In Example A4, the subject matter of any one of Examples A1-A3 can optionally include where the threshold changes between at least two frames in the video stream.

In Example A5, the subject matter of any one of Examples A1-A4 can optionally include a display engine register, wherein a value that represents the pixel row processed by the display engine is stored in the display engine register.

In Example A6, the subject matter of any one of Examples A1-A5 can optionally include where the encoder uses the pixel row value in the display engine register to determine a block in the frame to encode.

Example M1 is a method including identifying a frame in a video stream, processing a pixel row in the frame using a display engine to create blended and/or composited pixels, determine a coding unit (CU) row in the frame that an encoder is encoding, determining if a distance between the pixel row in the frame and the CU row in the frame satisfies a threshold, and storing the blended and/or composited pixels from the display engine in a cache if the threshold is satisfied.

In Example M2, the subject matter of Example M1 can optionally include storing the blended and/or composited pixels in memory if the threshold is not satisfied.

In Example M3, the subject matter of any one of the Examples M1-M2 can optionally include where the CU row in the frame the encoder is encoding is determined by reading a value stored in an encoder register.

In Example M4, the subject matter of any one of the Examples M1-M3 can optionally include identifying a new frame in the video stream and changing the threshold to a new threshold.

In Example M5, the subject matter of any one of the Examples M1-M4 can optionally include storing a pixel row value that represents the pixel row in the frame that was processed by the display engine in a display engine register.

In Example M6, the subject matter of any one of Examples M1-M5 can optionally include where the encoder uses the pixel row value to determine a block in the frame to encode.

Example S1 is a system for dynamic caching of a video steam. The system can include memory, a cache, a display engine, a processing engine, where the processing engine includes a display engine, and an encoder. The system can also include at least one processor, where the processing engine is configured to cause the at least one processor to process, using the display engine, a pixel row in a frame that is included in a video stream to create blended and/or composited pixels, determine a coding unit (CU) row in the frame that an encoder is encoding, determine if a distance between the pixel row in the frame and the CU row in the frame satisfies a threshold, store blended and/or composited pixels from the display engine in a cache if the threshold is satisfied, and store the blended and/or composited pixels in memory if the threshold is not satisfied.

In Example S2, the subject matter of Example S1 can optionally include an encoder register, wherein a value that represents the CU row in the frame the encoder is encoding is stored in the encoder register.

In Example S3, the subject matter of any one of the Examples S1-S2 can optionally include where the threshold changes between at least two frames in the video stream.

In Example S4, the subject matter of any one of the Examples S1-S3 can optionally include where the threshold changes before the frame is completely processed by the display engine.

In Example S5, the subject matter of any one of the Examples S1-S4 can optionally include a display engine register, where a value that represents the pixel row processed by the display engine is stored in the display engine register.

In Example S6, the subject matter of any one of the Examples S1-S5 can optionally include where the encoder uses the pixel row value in the display engine register to determine a block in the frame to encode.

In Example S7, the subject matter of any one of the Examples S1-S6 can optionally include a packet merge engine, wherein the packet merge engine merges output from the encoder with an audio stream.

Example AA1 is an apparatus including means for identifying a frame in a video stream, means for processing a pixel row in the frame using a display engine to create blended and/or composited pixels, means for determining a coding unit (CU) row in the frame that an encoder is encoding, means for determining if a distance between the pixel row in the frame and the CU row in the frame satisfies a threshold, and means for storing the blended and/or composited pixels from the display engine in a cache if the threshold is satisfied.

In Example AA2, the subject matter of Example AA1 can optionally include means for storing the blended and/or composited pixels in memory if the threshold is not satisfied.

In Example AA3, the subject matter of any one of Examples AA1-AA2 can optionally include where the CU row in the frame the encoder is encoding is determined by reading a value stored in an encoder register.

In Example AA4, the subject matter of any one of Examples AA1-AA3 can optionally include where means for identifying a new frame in the video stream and means for changing the threshold to a new threshold.

In Example AA5, the subject matter of any one of Examples AA1-AA4 can optionally include means for storing a pixel row value that represents the pixel row in the frame that was processed by the display engine in a display engine register.

In Example AA6, the subject matter of any one of Examples AA1-AA5 can optionally include where the encoder uses the pixel row value to determine a block in the frame to encode.

In Example AA7, the subject matter of any one of Examples AA1-AA6 can optionally include means for changing the threshold to a new threshold before the frame is processed by the display engine.

Example X1 is a machine-readable storage medium including machine-readable instructions to implement a method or realize an apparatus as in any one of the Examples A1-A6, AA1-AA7, or M1-M6. Example Y1 is an apparatus comprising means for performing any of the Example methods M1-M6. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one machine readable medium comprising one or more instructions that, when executed by at least one processor, causes the at least one processor to:
    identify a frame in a video stream;
    process a pixel row in the frame using a display engine to create blended and/or composited pixels;
    determine a coding unit (CU) row in the frame that an encoder is encoding;
    determine if a distance between the pixel row in the frame and the CU row in the frame satisfies a threshold; and
    store the blended and/or composited pixels from the display engine in a cache if the threshold is satisfied.

2. The at least one machine readable medium of claim 1, comprising one or more instructions that, when executed by at least one processor, causes the at least one processor to:
    store the blended and/or composited pixels in memory if the threshold is not satisfied.

3. The at least one machine readable medium of claim 1, wherein the CU row in the frame the encoder is encoding is determined by reading a value stored in an encoder register.

4. The at least one machine readable medium of claim 1, comprising one or more instructions that, when executed by at least one processor, causes the at least one processor to:
    identify a new frame in the video stream; and
    change the threshold to a new threshold.

5. The at least one machine readable medium of claim 1, comprising one or more instructions that, when executed by at least one processor, causes the at least one processor to:
    store a pixel row value that represents the pixel row in the frame that was processed by the display engine in a display engine register.

6. The at least one machine readable medium of claim 5, wherein the encoder uses the pixel row value to determine a block in the frame to encode.

7. An electronic device comprising:
    memory;
    a cache;
    a processing engine, wherein the processing engine includes:
        a display engine; and
        an encoder; and
    at least one processor, wherein the processing engine is configured to cause the at least one processor to:
    process, using the display engine, a pixel row in a frame that is included in a video stream;
    determine a coding unit (CU) row in the frame that an encoder is encoding;
    determine if a distance between the pixel row in the frame and the CU row in the frame satisfies a threshold; and
    store blended and/or composited pixels from the display engine in a cache if the threshold is satisfied.

8. The electronic device of claim 7, wherein the processing engine is configured to cause the at least one processor to:
    store the blended and/or composited pixels in memory if the threshold is not satisfied.

9. The electronic device of claim 7, further comprising:
    an encoder register, wherein a value that represents the CU row in the frame the encoder is encoding is stored in the encoder register.

10. The electronic device of claim 7, wherein the threshold changes between at least two frames in the video stream.

11. The electronic device of claim 7, further comprising:
    a display engine register, wherein a value that represents the pixel row processed by the display engine is stored in the display engine register.

12. The electronic device of claim 11, wherein the encoder uses the pixel row value in the display engine register to determine a block in the frame to encode.

13. A method comprising:
    identifying a frame in a video stream;
    processing a pixel row in the frame using a display engine to create blended and/or composited pixels;
    determine a coding unit (CU) row in the frame that an encoder is encoding;
    determining if a distance between the pixel row in the frame and the CU row in the frame satisfies a threshold; and
    storing the blended and/or composited pixels from the display engine in a cache if the threshold is satisfied.

14. The method of claim 13, further comprising:
    storing the blended and/or composited pixels in memory if the threshold is not satisfied.

15. The method of claim 13, wherein the CU row in the frame the encoder is encoding is determined by reading a value stored in an encoder register.

16. The method of claim 13, further comprising:
    identifying a new frame in the video stream; and
    changing the threshold to a new threshold.

17. The method of claim 13, further comprising:
    storing a pixel row value that represents the pixel row in the frame that was processed by the display engine in a display engine register.

18. The method of claim 17, wherein the encoder uses the pixel row value to determine a block in the frame to encode.

19. A system for dynamic caching of a video stream, the system comprising:
    memory;
    a cache;
    a display engine;
    a processing engine, wherein the processing engine includes:
        a display engine; and
        an encoder; and
    at least one processor, wherein the processing engine is configured to cause the at least one processor to:
        process, using the display engine, a pixel row in a frame that is included in a video stream to create blended and/or composited pixels;
        determine a coding unit (CU) row in the frame that an encoder is encoding;
        determine if a distance between the pixel row in the frame and the CU row in the frame satisfies a threshold;
        store blended and/or composited pixels from the display engine in a cache if the threshold is satisfied; and
        store the blended and/or composited pixels in memory if the threshold is not satisfied.

20. The system of claim 19, further comprising:
    an encoder register, wherein a value that represents the CU row in the frame the encoder is encoding is stored in the encoder register.

21. The system of claim 19, wherein the threshold changes between at least two frames in the video stream.

22. The system of claim 19, wherein the threshold changes before the frame is completely processed by the display engine.

23. The system of claim 19, further comprising:
    a display engine register, wherein a value that represents the pixel row processed by the display engine is stored in the display engine register.

24. The system of claim 23, wherein the encoder uses the pixel row value in the display engine register to determine a block in the frame to encode.

25. The system of claim 19, further comprising:
a packet merge engine, wherein the packet merge engine merges output from the encoder with an audio stream.

* * * * *

UNITED STATES PATENT AND TRADEMARK OFFICE
CERTIFICATE OF CORRECTION

PATENT NO. : 10,863,183 B2
APPLICATION NO. : 16/455540
DATED : December 8, 2020
INVENTOR(S) : Jason Tanner et al.

Page 1 of 1

It is certified that error appears in the above-identified patent and that said Letters Patent is hereby corrected as shown below:

On the Title Page

Column 2, item [56] under "OTHER PUBLICATIONS", Line 3, after "No." insert -- 15/867,250 --, therefor.

Signed and Sealed this
Twelfth Day of January, 2021

Andrei Iancu
*Director of the United States Patent and Trademark Office*